United States Patent [19]
Carlile et al.

[11] 3,774,756
[45] Nov. 27, 1973

[54] MOLDED PLASTIC SNAP FASTENER FOR STRIP OF COMPONENTS THEREFORE

[75] Inventors: Alfred E. Carlile; Bernard H. Cox, both of Meadville, Pa.

[73] Assignee: Textron Inc., Providence, R.I.

[22] Filed: Mar. 6, 1972

[21] Appl. No.: 232,070

Related U.S. Application Data

[62] Division of Ser. No. 868,544, Oct. 22, 1969, Pat. No. 3,685,105.

[52] U.S. Cl. ............ 206/56 AB, 24/216, 206/56 A, 264/297
[51] Int. Cl. ............................................. B65d 73/00
[58] Field of Search ................... 206/56 AB, 56 A; 24/216; 264/297

[56] References Cited
UNITED STATES PATENTS

| | | | |
|---|---|---|---|
| 3,553,796 | 1/1971 | Carlile | 24/216 |
| 2,964,171 | 12/1960 | Chadwick | 206/56 AB |
| 3,013,308 | 12/1961 | Armour | 264/297 |

*Primary Examiner*—William T. Dixson, Jr.
*Attorney*—Alexander R. Field

[57] ABSTRACT

A molded plastic snap fastener including a stud member having attaching legs for insertion in recesses in a backing member, a socket member having attaching legs for insertion in recesses in another identical backing member, and a strip of the above components for forming a plurality of the snap fasteners.

4 Claims, 6 Drawing Figures

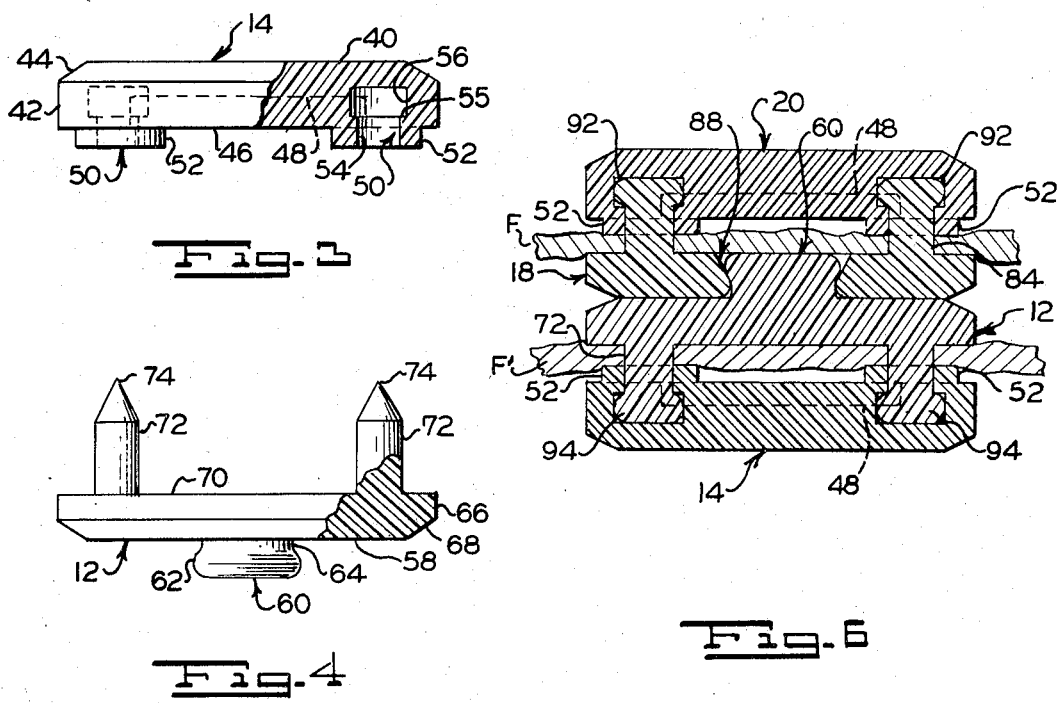

MOLDED PLASTIC SNAP FASTENER FOR STRIP OF COMPONENTS THEREFORE

CROSS REFERENCE TO RELATED APPLICATIONS

The present application is a division of our application Ser. No. 868,544 filed Oct. 22, 1969 now U.S. Pat. No. 3,685,105.

BACKGROUND OF THE INVENTION

1. Field of the Invention

The present invention pertains to molded plastic snap fasteners and more particularly to such fasteners manufactured in continuous strip form.

2. Description of the Prior Art

Conventional snap fasteners are made of metal and are expensive to produce as well as being unattractive due to the difficulty to coloring them to coincide with fabric to which they are to be attached. Plastic snap fasteners have been devised which are less expensive to produce and which are easily colored to match various fabrics; however, prior plastic snap fasteners suffer from one or more of the disadvantages of being difficult to assemble, requiring heat for attachment of parts, having attaching parts visible, and requiring bulky hoppers and raceways for use with machines for automatically attaching the snap fasteners to fabric. Some prior plastic snap fasteners have been constructed of a pair of backing members which are secured to a socket member and a mating stud member with the fabric gripped therebetween. Such multicomponent plastic snap fasteners have the disadvantages mentioned above and further have increased problems concomitant with machines for automatically attaching the snap fasteners to fabric due to difficulties in controlling the position of the components being fed to the machine and in permanently and firmly attaching the snap fasteners to the fabric.

SUMMARY OF THE INVENTION

Accordingly, it is an object of the present invention to produce molded multicomponent plastic snap fasteners which may be easily attached to fabric by automatic machines.

The present invention is summarized in a molded plastic snap fastener including a pair of backing members each having a plurality of recesses with counterbores therein, a stud member having a bulbous projection and a plurality of attaching legs, the stud member being superposed with one of the backing members with the attaching legs inserted in the recesses and distorted to be captured in the counterbores, and a socket member having an aperture therein and a plurality of attaching legs, the socket member being superposed with the other backing member with the attaching legs inserted in the recesses and distorted to be captured in the counterbores, the bulbous projection of the stud member being inserted in the aperture in the socket member to close the snap fastener.

Another object of the present invention is to use a plurality of counterbores in a backing member to distort and capture attaching legs of the stud and socket members of a snap fastener.

A further object of the present invention is to utilize projecting collars for recesses in a backing member to resiliently grip attaching legs of the stud and socket members to a snap fastener.

The present invention has another object in the manufacture of a continuous strip of components for forming a plurality of snap fasteners.

Another object of the present invention is to form the components of a snap fastener in a lateral row and to longitudinally align a plurality of the lateral rows to form a continuous strip.

Some of the advantages of the present invention over the prior art are that the strips of snap fastener components are compatible with machines for automatically attaching the snap fasteners to fabric, that the components are assembled without heat, that the bottoms of counterbores in backing members distort attaching legs under pressure without the requirement of special tools, and that projecting collars around recesses in backing members resiliently grip attaching legs to prevent disassembly.

Further objects and advantages of the present invention will become apparent from the following description of a preferred embodiment taken in conjunction with the accompanying drawings.

BRIEF DESCRIPTION OF THE DRAWINGS

FIG. 3 is a broken side elevation, partially in section, of a backing member for use with the present invention.

FIG. 4 is a broken side elevation, partially in section, of a stud member for use with the snap fastener of the present invention.

FIG. 5 is a broken side elevation, partially in section, of a socket member for use with the snap fastener of the present invention.

FIG. 6 is an offset section of an assembled snap fastener according to the present invention.

DESCRIPTION OF THE PREFERRED EMBODIMENT

Figures 1, 2:
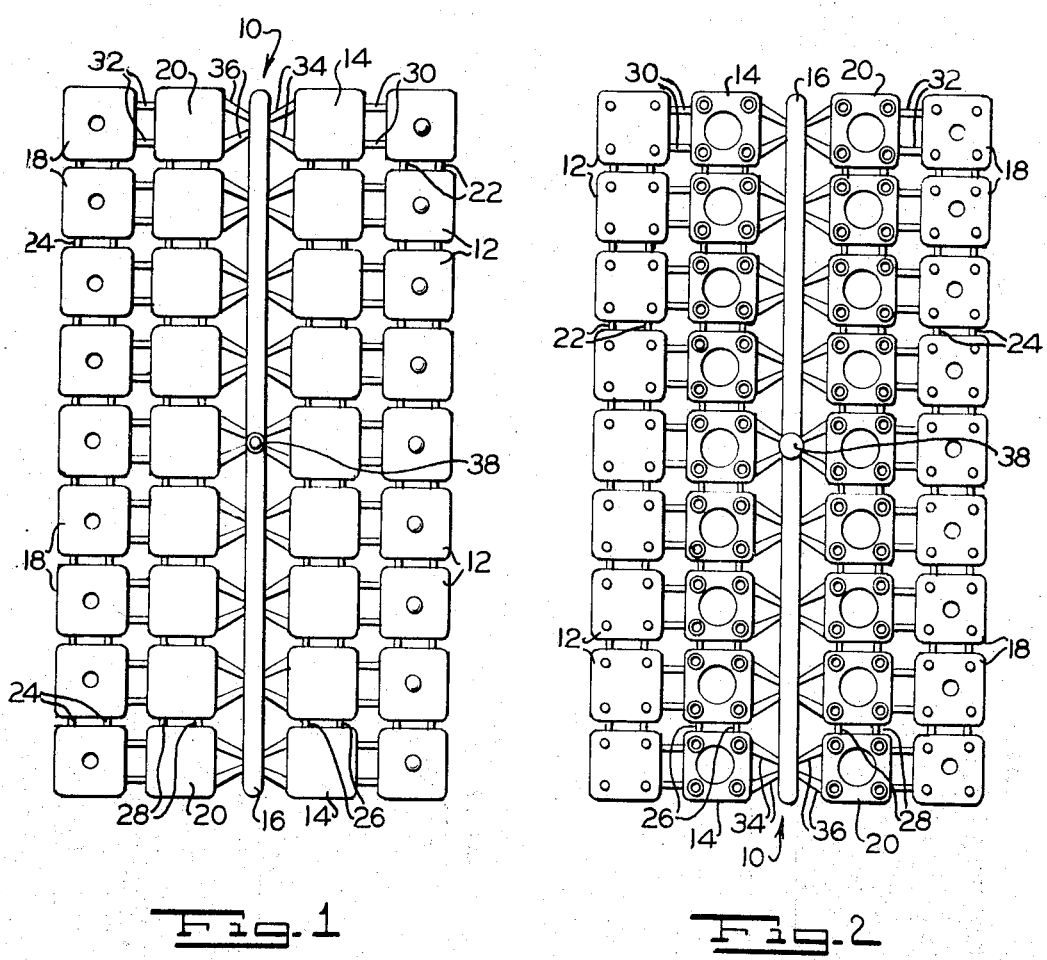
FIG. 1 is a top plan view of a strip of components for forming a plurality of snap fasteners according to the present invention.
FIG. 2 is a bottom plan view of the strip of snap fasteners of FIG. 1.

A continuous strip of components for use in assembling a plurality of snap fasteners in accordance with the present invention is illustrated in FIGS. 1 and 2 and is indicated generally at 10. The strip 10 includes a plurality of stud members 12 arranged in parallel spaced relation with a plurality of backing members 14 to define a first half of strip 10 on one side of a centrally positioned longitudinal bar 16. A plurality of socket members 18 are arranged in parallel spaced relation with another plurality of backing members 20 which are identical to backing members 14 to define a second half of strip 10. Stud members 12, socket members 18 and backing members 14 and 20 are each longitudinally spaced by pairs of connecting legs 22, 24, 26 and 28, respectively. Stud members 12 are laterally spaced from backing members 14 by pairs of connecting arms 30, and socket members 18 are laterally spaced from backing members 20 by connecting arms 32.

Each snap fastener includes a stud member 12, a backing member 14, a socket member 18 and a backing member 20 such that a lateral row of components in strip 10 forms a single snap fastener. The components of each snap fastener are supported by longitudinal bar 16 through pairs of angularly oriented connecting arms 34 and 36 which are disposed on either side of longitudinal bar 16 and connect with backing members 14 and 20, respectively. An upstanding projection 38 extends from a central position on longitudinal bar 16.

The strip 10 is desirably formed by injection of a suitable plastic material, such as nylon or Delrin, into a multicavity mold. Longitudinal bar 16, connecting legs 22, 24, 26 and 28, and connecting arms 30, 32, 34 and 36 serve to assure that each component of the snap fastener is completely formed and to strengthen strip 10.

Since backing members 14 and 20 are identical only backing member 14 will be described, as illustrated in FIG. 3. Backing member 14 has a generally square shape and an outer face 40 which merges with four sides 42 through a beveled peripheral edge 44. An inner face 46 of backing member 14 has a large annular recess 48 centrally disposed therein; and four smaller recesses, generally indicated at 50, are arranged at the corners of inner face 46. Each recess 50 has an annular collar 52 therearound projecting from inner face 46, and each recess 50 includes a first bore 54 and a counterbore 56 defining a shoulder 55 therebetween.

One of the generally square stud members 12 is illustrated in FIG. 4 and has an outer face 58 and a projection 60 which is centrally disposed and projects outwardly from outer face 58. Projection 58 has a bulbous outer portion 62 having a diameter greater than a neck 64 which connects outer portion 62 with outer face 58. Outer face 58 merges with four sides 66 through a beveled peripheral edge 68. An inner face 70 has four solid cylindrical attaching legs 72 arranged at the corners thereof, and each attaching leg 72 has a pointed end 74. The diameters of the cylindrical portions of attaching legs 72 are slightly greater than the diameters of bores 54 of recesses 50 in backing member 14.

One of the generally square, socket members 18 is illustrated in FIG. 5 and includes an outer face 76 merging with four sides 78 through a beveled peripheral edge 80. An inner face 82 has four solid, cylindrical attaching legs 84 arranged at the corners thereof, and each of the attaching legs 84 has a pointed end 86. The diameters of the cylindrical portions of attaching legs 84 are slightly larger than the diameters of bore 54 of recesses 50 in backing member 20. A central aperture, generally indicated at 88, extends through socket member 18 and has an annular constriction 90 disposed near outer face 76.

To assemble the snap fasteners of the present invention the attaching legs 84 of socket member 18 are pierced through a piece of fabric F to which the snap fastener is to be attached. Backing member 20 is superposed on the other side of fabric F such that pointed ends 86 of attaching legs 84 are received in recesses 50. Attaching legs 84 are then forced into bores 54, which are smaller than attaching legs 84, until pointed ends 86 contact the bottom of counterbores 56. Further pressure forcing backing member 20 and socket member 18 together causes pointed ends 86 to be distorted to form heads 92 which are captured in counterbores 56 against shoulders 55 to hold the components together. Since attaching legs 84 are slightly larger than bores 54 and since collars 52 around recesses 50 project from inner face 46 so as to be flexible, the collars expand during pressure assembly of socket member 18 with backing member 14, and the memory of the plastic material permits attaching legs 84 to be firmly and resiliently gripped by collars 52, as best illustrated in FIG. 6.

In a similar manner, stud member 12 is assembled with backing member 14 after piercing through a piece of fabric F to which the snap fastener is to be attached. Pointed ends 74 of attaching legs 72 are distorted to form captured heads 94, and collars 52 resiliently grip attaching legs 72 due to the memory of the plastic material.

Since the diameter of aperture 88 at outer face 76 is slightly larger than annular constriction 90, projection 60 is guided into aperture 88, and, due to the resilient memory characteristic of the plastic material, the snap fastener may be closed by forcing projection 60 through annular constriction 90 in aperture 88 as illustrated in FIG. 6. The centrally disposed annular recesses 48 in inner faces 46 of backing members 14 and 20 are adapted to receive any bunching of the fabric to which the snap fastener is attached.

It may be seen that the snap fastener after assembly is aesthetically pleasing since the connections between stud member 12, socket member 18 and backing members 14 and 20 are not visible. By providing the components of the snap fasteners according to the present invention in lateral rows and in strip form, the snap fasteners may be easily supplied to a machine for severing of the connecting arms and legs to permit automatic attachment of the snap fasteners to fabric. Automatic attachment of the snap fasteners is also facilitated by the relative positioning of the components to simplify superposing of stud members 12 and backing members 14 and socket members 18 and backing members 20. To this end longitudinal bar 16 and projection 38 provide indexing means to assure proper positioning of the strip 10 as well as providing strengthening means to facilitate handling.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A strip of components for forming a plurality of snap fasteners comprising a plurality of longitudinally aligned stud members;

a plurality of first backing members longitudinally aligned in lateral, spaced, parallel relation with said plurality of stud members, with each of said first backing members in lateral alignment with a respective stud member;

a plurality of longitudinally aligned socket members;

a plurality of second backing members longitudinally aligned in lateral, spaced, parallel relation with said plurality of socket members, with each of said second backing members in alignment with a respective socket member;

longitudinal leg means interconnecting each of said plurality of stud members, each of said plurality of first backing members, each of said plurality of socket members, and each of said plurality of second backing members;

first lateral means connecting said stud members with said first backing members defining a first half of said strip;

second lateral means connecting said socket members with said second backing members defining a second half of said strip; and central means disposed between said first and second strip halves including a longitudinal bar having lateral arms arranged in pairs on either side of said longitudinal bar with each of said pairs of lateral arms connecting respective members of said first and second strip halves.

2. The strip of components as recited in claim 1 wherein the first backing members and laterally aligned stud members of the first half of said strip are in lateral alignment with respective second backing members and laterally aligned socket members of the second half of said strip.

3. The strip of components as recited in claim 1 wherein said longitudinal leg means comprises pairs of legs disposed between adjacent longitudinally aligned members.

4. The invention as recited in claim 1 wherein said first and second backing members are identical and include a plurality of recesses having projecting collars therearound and counterbores, and wherein said stud members and said socket members have attaching legs extended therefrom for reception by said recesses of said first and second backing members when the snap fasteners are assembled.

* * * * *